United States Patent [19]

Siryj

[11] 3,986,604
[45] Oct. 19, 1976

[54] OBJECT ORIENTATION APPARATUS
[75] Inventor: Bohdan Wolodymyr Siryj, Cinnaminson, N.J.
[73] Assignee: RCA Corporation, New York, N.Y.
[22] Filed: Dec. 15, 1975
[21] Appl. No.: 640,909

[52] U.S. Cl. .............................. 198/395; 250/223 R
[51] Int. Cl.² ........................................ B65G 47/24
[58] Field of Search .................. 198/21, 39, 40, 29, 198/246, 248, 249, 251, 252, 254, 262, 268, 276, 277, 281, 287, 288, 283, 284; 271/248, 250; 250/223 R; 209/111.7 T, 82

[56] References Cited
UNITED STATES PATENTS

| | | | |
|---|---|---|---|
| 3,592,326 | 7/1971 | Zimmerle et al. | 198/249 |
| 3,743,093 | 7/1973 | Klancnik | 209/82 |
| 3,774,040 | 11/1973 | Stephanos | 250/223 R |
| 3,913,730 | 10/1975 | Gruodis | 198/29 |

FOREIGN PATENTS OR APPLICATIONS

| | | | |
|---|---|---|---|
| 1,395,855 | 3/1965 | France | 198/277 |

Primary Examiner—John J. Love
Assistant Examiner—Joseph E. Valenza
Attorney, Agent, or Firm—Edward J. Norton; Raymond E. Smiley

[57] ABSTRACT

A right parallelepiped object is located on an upwardly inclined moving conveyor having a low coefficient of friction and spaced apart cleats. A dimension to be oriented of the object is in one of three known orientations: along the conveyor, across the conveyor, or normal to the conveyor. Depending on the initial orientation and the desired orientation, the object is in one case rotated on the conveyor by a pivotally movable arm an amount in excess of 45° and then oriented to complete a full 90° rotation by one of the cleats advanced by the conveyor. Alternately, the object is moved off the conveyor onto a platform which is thereafter tilted such that the object falls to a given one of its other sides, thereafter being in its desired orientation.

5 Claims, 4 Drawing Figures

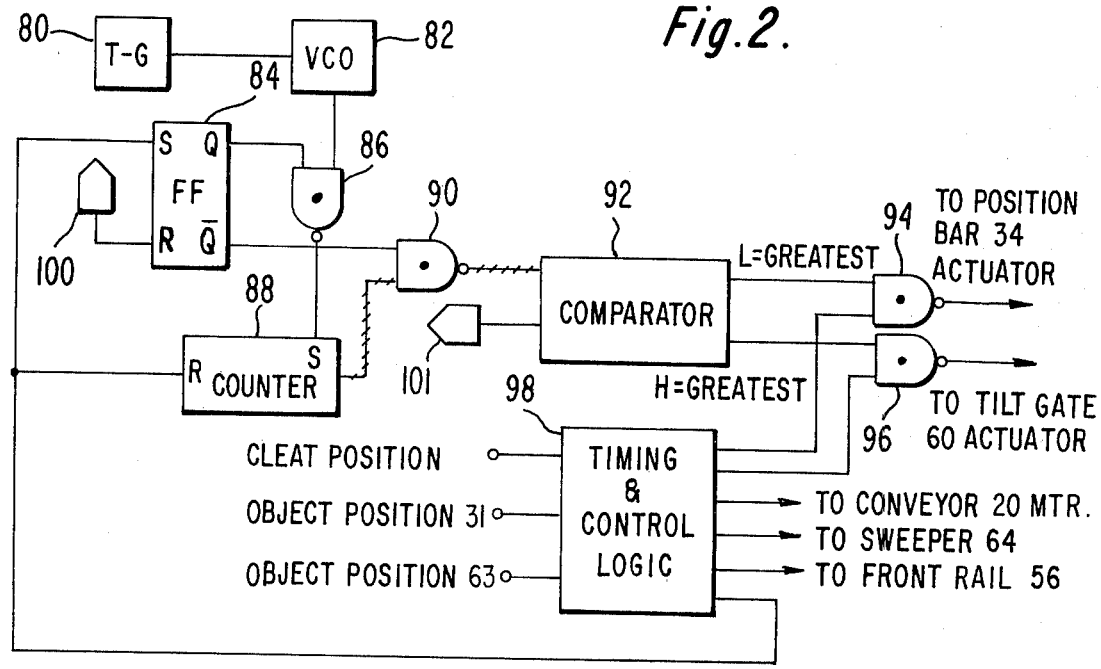

OBJECT ORIENTATION APPARATUS

BACKGROUND OF THE INVENTION

The movement of right parallelepiped objects such as packages, boxes, and the like, often requires moving each object with one of its three dimensions, for example, the longest dimension in a given orientation. Yet, the objects are often inducted into a system in any orientation. It is, therefore, necessary to provide apparatus for determining the input orientation of the object and for manipulating the object such that the desired dimension is in the desired orientation.

SUMMARY OF THE INVENTION

Apparatus for positioning a right parallelepiped object so that one of its three dimensions is in a desired orientation includes an inclined, low coefficient of friction conveyor on which the object rests and further includes at least a cleat to which the object slides along the conveyor. When the object is positioned against the cleat, dimension X is in one of three orientations; in the direction of the conveyor movement, across the conveyor, or normal to the conveyor. Also included is a means for producing a signal indicative of the orientation of dimension X, means responsive to a signal indicating dimension X is in one of the orientations that rotates the object on the conveyor an amount in excess of 45°, and then moves the conveyor until the object rests against the cleat in the desired orientation. Another means is responsive to an indication that the object is in another orientation to move the object off the conveyor onto a tray, tilting the object so that it falls over on a known one of its sides thereafter being in the desired orientation.

BRIEF DESCRIPTION OF THE DRAWING

FIG. 2 is an electrical schematic in block diagram form of electronics used to control the apparatus of FIG. 1;

FIGS. 3a–c are three sequentially time spaced plan views of a portion of FIG. 1 illustrating the reorientation of an object.

DETAILED DESCRIPTION

Figure 1:
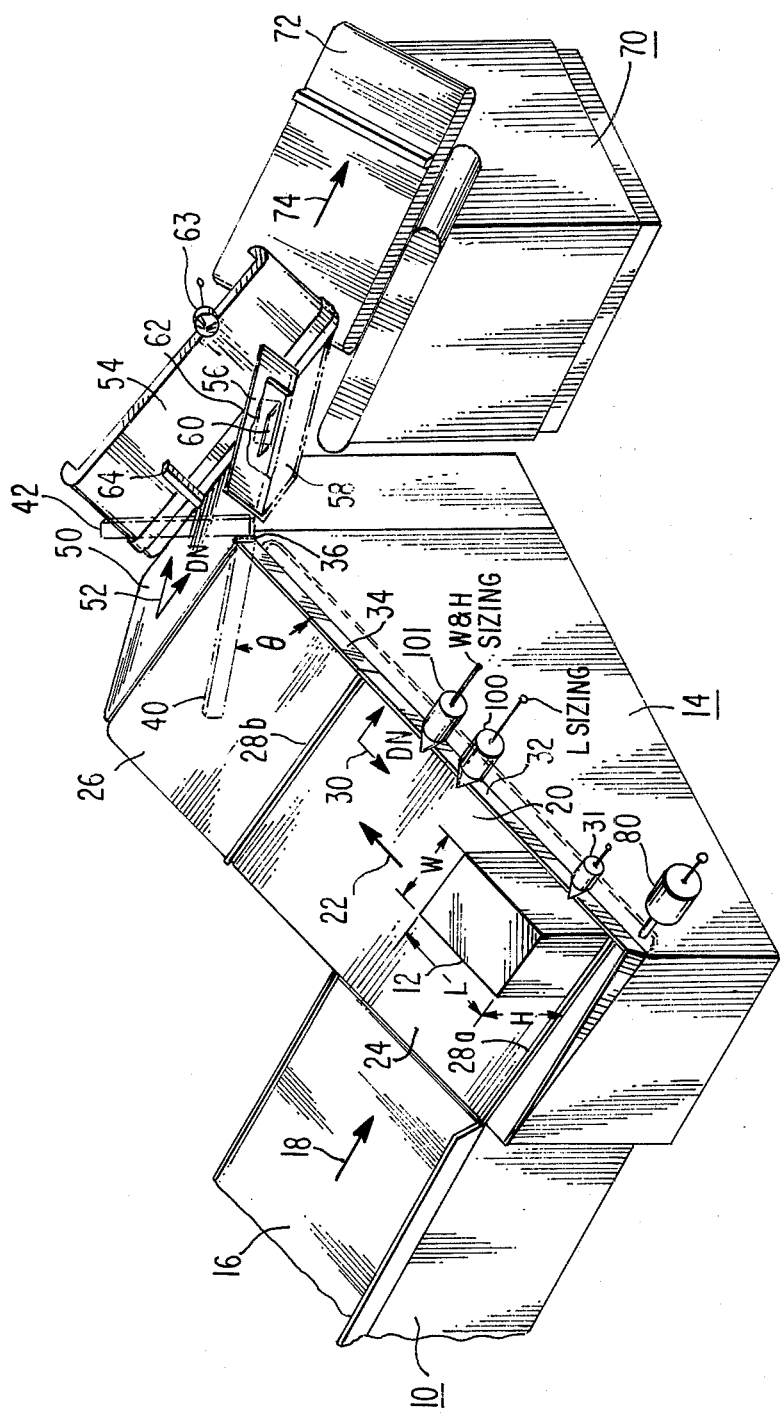
FIG. 1 is an object orientation apparatus in accordance with a preferred embodiment of the invention.

Referring to FIG. 1, an induction means generally labelled 10 (not part of the invention) is adapted to induct right parallelepiped objects, such as packages 12, one at a time, into the object orientation apparatus generally labeled 14. Induction means 10 may include a moving conveyor 16 having a conveying surface moving in the direction of arrow 18. Apparatus 14 includes a movable conveyor 20, the upper surface of which is advanced in the direction of arrow 22 by a motor (not shown) under control of apparatus to be described shortly. Object 12 advances from a relatively depressed input end 24 to a relatively elevated output end 26. A plurality of cleats, 28a and 28b being shown, are attached to the conveyor 20 at uniformly spaced apart intervals lying in a direction orthogonal to the direction of conveyor movement. The surface of conveyor 20 on which objects, such as package 12, reside is angled downward toward input end 24 and also across the conveyor as indicated by arrows 30, and has a very low coefficient of friction. As a result, an object 12 tends to fall down against side guide 32. Side guide 32 is fixed in a position parallel to the direction of movement of conveyor 20 and along the relatively depressed side of the conveyor.

An assembly for rotating objects 12 includes a positioning bar 34, which is pivotally attached at one end thereof 36 to orientation apparatus 14. In its normal rest position, bar 34 forms a continuum of guide 32. Bar 34 is pivoted to a first phantom position 40 through an angle $\theta$ from its rest position and then pivoted away from the surface of conveyor 20, as illustrated in the second phantom position 42 before returning to the rest position. The rotation of bar 34 to position 40 serves to rotate an object 12 located thereat an amount greater than 45°, but not in excess of 90° from its original position. The following cleat 28 completes rotation of the object a full 90°, while bar 34 is moved away from the surface of conveyor 20 to avoid blocking passage of a next following object or parcel. Positioning bar 34 desirably pivots to position 40 in a path such that its undersurface just clears cleats 28 so that objects in the form of parcels, for example, having a very short dimension normal to the conveyor surface will not be passed over by the bar. Soft bristles are attached to the underside of bar 34 to sweep thin parcels to angle $\theta$.

Located just beyond the output end of conveyor 20 is a tray 50 of low coefficient of friction material angled as indicated by downward arrows 52. Guide rails 54 and 56 are provided to limit travel of an object 12 so that it does not slide off the tray. Depending on the ultimate path of an object 12 (i.e., out the side having rail 54 or out the side having guide rail 56), one of the rails is pivotally mounted, as illustrated. In FIG. 1, it is desired that object 12 exit via the side of apparatus 14, not out the end. Therefore, rail 56 is pivotally mounted along tray 50 so that it may be pivoted to the position shown in phantom at 58, thus forming an extension of tray 50. An object tilting assembly or gate 60 is located near rail 56. It is operable to tilt toward rail 56 into phantom position 62, as will be described more fully. Rail 54 is accordingly fixed, and is provided with a sweeper bar 64, which at the proper time pushes or sweeps an object 12 over gate 56 when in phantom position 58. A receiving conveyor assembly generally legended 70 is positioned to receive objects from tray 50. Since a side exiting system is illustrated, conveyor assembly 70 is located at the side of orientation apparatus 14. Assembly 70 includes a moving conveyor 72, moving in the direction of arrow 74, for moving objects away from orientation apparatus 14.

Movement of the various components of apparatus 14 is under the control of the electronic apparatus illustrated in FIG. 2 to which attention is now directed. A tachometer generator 80 mechanically coupled to conveyor 20 (FIG. 1) produces electrical signals at its output terminal corresponding to the speed of the conveyor and is coupled to a voltage controlled oscillator (VCO) 82. The output terminal of VCO 82 and the Q output terminal of a flip-flop 84 are respectively coupled to first and second input terminals of a NAND gate 86. The output terminal of NAND gate 86 is coupled to the set (S) terminal of decrementing counter 88. A multi-wire cable output of counter 88 and the Q output terminal of flip-flop 84 are respectively coupled to first and second input terminals of an element illustrated symbolically as a NAND gate 90. (Cross hatching on a conductive path indicates a multiconductor cable). The output terminals of NAND gate 90 are coupled via a multi-conductor cable to an input terminal of a comparator 92 for the purpose of providing via a L sizing detector 100 to be discussed electric signals indicative of the length (L) of an object (FIG. 1). Electric signals determinative of the width (W) and height (H) are also applied to comparator 92 as indicated. The width (W) and height can be determined by suitable apparatus illustrated in FIG. 1 as W and H sizing detector 101 in the area of L sizing detector 100. Apparatus for providing width (W) and height (H) sizing is fully described and illustrated in United States Patent Application Ser. No. 630,649, filed Nov. 10, 1975, by W. Borgese, and assigned to the common assignee, for example, and in itself forms no part of the present invention. Various other techniques may be employed for this purpose.

Comparator 92 receives information concerning the length, width and height dimensions of object 12 while the object is resting on conveyor 20 before any manipulation and is adapted to produce a signal at its output terminals which, in effect, determines the present orientation of a desired dimension. That is, it may be designed to produce signals indicating the present orientation of the greatest dimension, the shortest dimension, or the intermediate dimension. As illustrated, comparator 92 produces a signal indicative of the orientation of the greatest dimension. Therefore, if the length is the greatest dimension, a pulse will appear on the line labeled $L = $ greatest which is coupled to one input terminal of NAND gate 94. Similarly, if the height is the greatest dimension, a pulse will appear on the line H = greatest, which is coupled to one input terminal of a NAND gate 96. The second input terminal of each of NAND gates 94 and 96 is coupled to respective output terminals of a timing and control logic TCL 98. The output terminal of NAND gate 94 is coupled to position bar 34 actuator (FIG. 1). The output terminal of NAND gate 96 (FIG. 1) is coupled to tilt gate 60 actuator (FIG. 1).

TCL 98 controls all the movements of the various movable elements of the apparatus of FIG. 1. Output terminals of logic 98 are coupled respectively to the conveyor 20 motor (not shown, but of conventional design), which advances conveyor 20, to sweeper 64, to rail 56, to the reset (R) terminal of counter 88, and to the set (S) terminal of flip-flop 84. TCL 98 contains a clock and various delays, pulse forming circuits and power amplifiers to produce pulses at the desired time and of the desired polarity and power requirements. The sensor or L sizing detector 100, located just prior to the free end of bar 34 along the side of conveyor 20 (FIG. 1) is adapted to produce a signal at its output terminal indicating passage of the leading edge of an object 12, which terminal is coupled to the reset (R) terminal of flip-flop 84. Another reference means (not shown, but coupled to TCL 98) indicates when a cleat 28 is in position to receive an object from conveyor 16, and therefore when cleat 28b is positioned just prior to the leading edge of arm 34 (the spacing between successive cleats is such that this will occur). Such reference means may be integral with the conveyor 20 or in the driving means therefore. Two object position locators, represented as detectors 31 and 63 in FIG. 1, are also coupled to input terminals of TCL 98 to locate when an object is against guide 32 and against rail 54 respectively.

Operation of the object orientation apparatus is as follows: It will be initially assumed that flip-flop 84 (FIG. 2) is reset, that a right parallelepiped object is located on conveyor 16, that no object is on conveyor 20 or tray 50, that conveyor 20 is at rest with cleat 28a as shown with a cleat position signal being received by TCL 98. Then conveyor 16 is operated to move object 12 onto conveyor 20. Due to the low coefficient of friction on the conveyor and due to its inclination, the object slides to the position illustrated in FIG. 1, i.e., against cleat 28a and side guide 32. When the object contacts guide 32, a pulse is transmitted to TCL 98. As a direct result of receipt of the pulse, TCL 98 performs three tasks: (1) it resets counter 88; (2) it sets flip-flop 84, priming gate 86 to receive pulses from VCO 82 to decrement counter 88; (3) it provides power to advance conveyor 20 in the direction of arrow 22.

Counter 88 is reset to a count which corresponds to the time for cleat 28a (and thus the trailing edge of object 12) to move from its rest position illustrated in FIG. 1 to a position opposite sensor 100. Assuming for purposes of example only a distance of 1000 mm between the rest position of cleat 28a and sensor 100 and a conveyor speed of 100 mm/sec., the time for cleat 28a to move to a position opposite sensor 100 is 10 seconds. Further, assume that when conveyor 20 is moving at 100 mm/sec., the voltage applied by tachometer generator 80 to VCO 82 causes it to produce 10 pulses/sec. to decrement counter 88. Counter 88 should, therefore, be set to a count of 100 = 10 pulses/sec. times 10 seconds. It, therefore, follows that counter 88 will decrement one count for each 10 mm of counter movement = 100 mm/sec. ÷ 10 pulses/second.

Such an arrangement permits the length dimension (L) to be determined as follows. Assume an object 12 has a 300 mm length (a dimension to be determined). Therefore, when conveyor 20 has advanced 700 mm requiring 7 seconds, counter 88 will have decremented from a count of 100 to a count of 30 at which time the leading edge of object 12 is opposite sensor 100. The resulting pulse from sensor 100 resets flip-flop 84, blocking NAND gate 86 and thus blocking further decrementing pulses to counter 88. Therefore, the count remaining in counter 88 is directly related to the distance remaining between cleat 28a and sensor 100, or to the length of object 12. A count of 30 is distance in mm · 10 or centimeters of object 12.

It should be noted that while conveyor 20 has been described as moving at a constant speed, the measuring system operates even if it speeds up or slows down. This follows, since tachometer generator 80 will produce more or less voltage causing VCO 82 to produce more or fewer pulses per second. In any case, when the leading edge of object 12 is opposite sensor 100, the resulting signal from the Q output of flip-flop 84 primes gate 90 to pass signals concerning the length of object 12 to comparator 92. The comparator also receives signals corresponding to the width and height of the object in accordance with apparatus described, for example, in the aforementioned Borgese patent application.

When cleat 28a and therefore the trailing edge of object 12 reaches the illustrated position of cleat 28b (FIG. 1), TCL 98 will stop the conveyor motor. At this time, a new cleat (not shown) will occupy the position formerly occupied by cleat 28a, permitting entry of a new object. Cleat 28a is positioned so as to just clear the free end of arm 34. Since the goal is to have the longest dimension of object 12 lying along conveyor 72 in the direction of arrow 74, if comparator 92 determines that the length is the greatest dimension it will produce a pulse to prime gate 94. When conveyor 20 comes to rest as just described, TCL 98 will produce a pulse enabling gate 94 to activate bar 34.

Attention is now directed to FIG. 3, which illustrates in plan view a portion of conveyor 20 and tray 50 in three sequentially time spaced views. In FIG. 3a, object 12 is in position to be rotated. In FIG. 3b, bar 34 and thus object 12 have rotated through an angle θ and conveyor 20 under control of TCL 98 has begun to advance. In FIG. 3c, bar 34 has pivoted upward (out of the drawing figure) permitting the next object 12 to pass thereby. Also, object 12, by the action of the following cleat 28a, has rotated a full 90° so that the longest dimension is parallel to the direction of travel of conveyor 72 (FIG. 1) and is passing onto tray 50.

If the height or width of object 12 is its longest dimension, conveyor 20, under control of TCL 98, continues its onward motion pausing only until TCL 98 receives an indication that the next object has come into contact with guide 32. Position bar 34 is not actuated. When object 12 is moved onto tray 50, it slides against rails 54 and 56 due to the inclination of the tray, thereby providing a signal to TCL 98 on its input line legended Object Position 63. At this time, if the height is the greatest dimension, gate 96 previously primed by a signal from comparator 92 will be enabled by TCL 98, thereby providing power to tilt gate 60.

Figure 4:
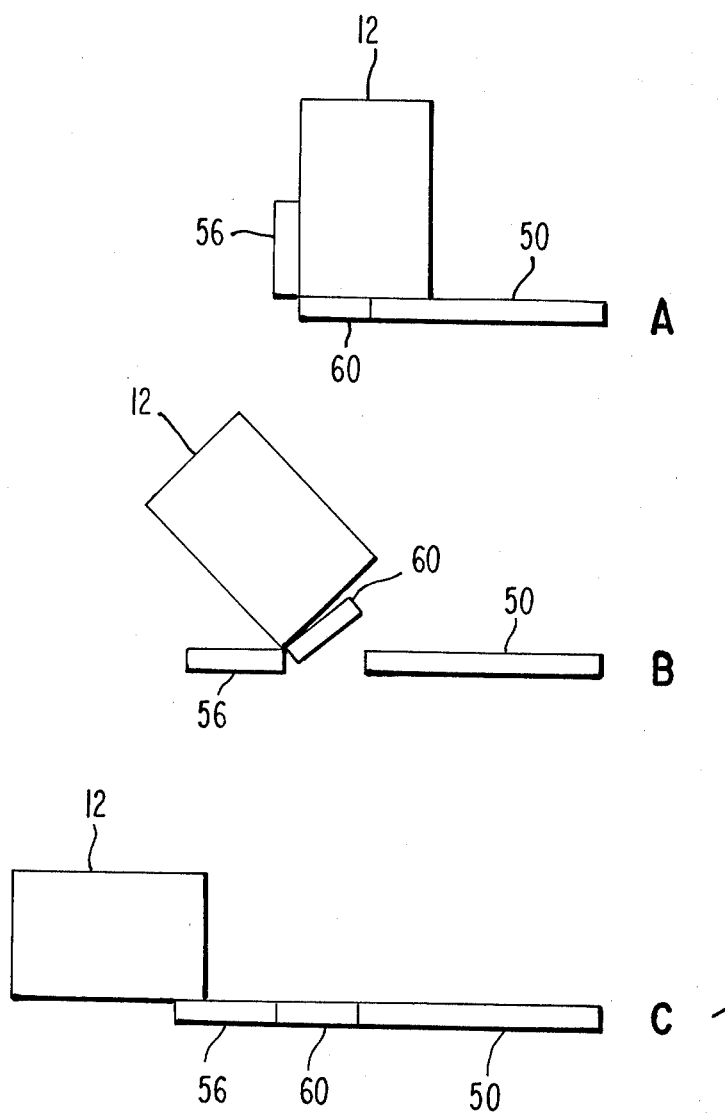
FIGS. 4a–c are three sequentially time spaced elevational views of a portion of FIG. 1 illustrating a different reorientation of an object.

Attention is now directed to FIGS. 4a–c, which are three sequentially spaced elevation views from the end of tray 50 containing rail 56 illustrating the reorientation of an object 12 having its longest dimension initially normal to the surface of conveyor 20. In FIG. 4a, object 12 is positioned on tilt gate 60 and against rail 56. In FIG. 4b, TCL 98 has issued a command directing rail 56 to pivot to form an extension of tray 50 (phantom 58 in FIG. 1). TCL 98 also has enabled gate 96 primed by a signal from comparator 92 (indicating the height to be the largest dimension), to tilt gate 60. Gate 60 has tilted object 12 to a position such that it has begun to tilt away from the gate. In FIG. 4c, object 12 has tilted 90° from its starting position such that it is parallel to conveyor 72 into which it falls.

Finally, if the longest dimension of object 12 is normal to the direction of motion of conveyor 20, as originally positioned, TCL 98, upon receiving an indication that the object is against rail 54 via detector 63, applies power to lower rail 56, and applies power to sweeper 64 to quickly move the object off tray 50 onto conveyor 72 to be moved away.

If it is desired to move objects away from orientation apparatus 14 in the general direction of motion of conveyor 20, the actions described in connection with the length and width dimensions will be reversed. Also, gate 54, not gate 56 will tilt, and tilt gate 60 will tilt toward gate 54. Sweeper 64 is eliminated.

What is claimed is:

1. Apparatus for positioning a right parallelepiped object so that one of its three dimensions X is in a desired orientation, comprising in combination:

an inclined upwardly moving conveyor having at least one cleat generally normal to the direction of movement thereof, the surface of said conveyor having a sufficiently low coefficient of friction such that an object carried thereon slides to said cleat, said object initially residing against said cleat with dimension X in one of three orientations, in the direction of the conveyor movement, across the conveyor, or normal to the conveyor, only one orientation being the desired orientation;

means for producing a signal the value of which is indicative of the initial orientation of dimension X;

means responsive to said signal having a value indicating said object has dimension X in a particular one of its three orientations for rotating said object on said conveyor an amount in excess of 45°, but not greater than 90°, and for thereafter moving said conveyor so that a cleat contacts said object to continue its rotation to 90° from its original orientation with said object thereby being in said desired orientation; and means responsive to said signal having a value indicating said object has dimension X in another of its orientations for moving said object to the output location of said conveyor and onto a tray located therebeyond and for thereafter tilting said object so that it falls over on a known one of its sides with dimension X thereby lying in said desired orientation.

2. The combination as set forth in claim 1, wherein the desired orientation is in a plane parallel to the conveyor in a direction normal to the direction of movement of said conveyor and wherein if dimension X is initially across the conveyor there is included means to move said object onto said tray and for moving said object off said tray, generally at right angles to the direction of movement of said conveyor, without rotating or tilting said object.

3. The combination as set forth in claim 1, wherein said tray has an elevated input end and an opposite depressed output end and includes a rail normally at right angles to said tray, said rail being moveable to form an extension of said tray, and wherein if dimension X is in the desired orientation said rail is moved to permit said object to slide thereoff without being tilted by said tilting means or rotated by said rotating means.

4. The combination as set forth in claim 1, wherein said means for rotating said object comprises a pivotable bar normally residing along one side of said conveyor which, when said object is moved to said position adjacent said bar, pivots in a plane parallel to the plane of said conveyor an amount in excess of 45° and then moves away from said conveyor.

5. The combination as set forth in claim 1 wherein said tray comprises a side rail normally generally at right angles to said tray and located in the vicinity of said tilting means, and means for moving said rail to a position which forms an extension of said tray as said tilting means tilts said object to cause said object to fall off said tray.

* * * * *